United States Patent [19]

Sloka

[11] Patent Number: 5,334,230

[45] Date of Patent: Aug. 2, 1994

[54] SEALED AIR DRYER WTIH TURBOSAVER VALVE

[75] Inventor: Alan Sloka, Weston, Mo.

[73] Assignee: Midland Brake, Inc., Kansas City, Mo.

[21] Appl. No.: 995,800

[22] Filed: Dec. 23, 1992

[51] Int. Cl.⁵ ........................................... B01D 50/00
[52] U.S. Cl. ..................................... 55/213; 55/218
[58] Field of Search ................................ 55/213, 218

[56] References Cited

U.S. PATENT DOCUMENTS

| | | | |
|---|---|---|---|
| 2,864,461 | 12/1958 | Dueker | 55/213 |
| 3,592,563 | 7/1971 | Glass et al. | |
| 3,832,831 | 9/1974 | Ritchie et al. | |
| 3,923,479 | 12/1975 | Glass et al. | |
| 4,026,685 | 5/1977 | Grix | 55/213 |
| 4,029,486 | 6/1977 | Frantz | |
| 4,544,385 | 10/1985 | Tanaka | |
| 4,714,483 | 12/1987 | Koening et al. | |
| 4,850,263 | 7/1989 | Rumsey et al. | |
| 4,892,569 | 1/1990 | Kojima | |
| 4,955,994 | 9/1990 | Knight et al. | 55/213 |
| 4,960,036 | 10/1990 | Gummer et al. | |
| 5,002,593 | 3/1991 | Ichishita et al. | 55/218 |
| 5,066,317 | 11/1991 | Gross et al. | 55/218 |
| 5,067,391 | 11/1991 | Choinski et al. | |
| 5,186,522 | 2/1993 | Spencer | 55/218 |

OTHER PUBLICATIONS

Bendix Brochure, "Operation of the AD-9 Air Dryer".

Primary Examiner—Tim Miles
Attorney, Agent, or Firm—Leydig, Voit & Mayer, Ltd.

[57] ABSTRACT

An air dryer is provided which permits the purge air to bypass the coalescing filter during the unloading cycle in order to minimize the back pressure in the desiccant filter, decrease the purge time of the dryer, and increase the efficiency of the air dryer. In one embodiment, the air dryer may have a passage disposed between the coalescing filter and the desiccant filter so as to permit purge air to bypass the coalescing filter during the unloading cycle. A turbosaver valve may also be disposed so that it controls not only the flow of air through the coalescing filter but also the discharge of the purge air and the contaminants. Disposing the turbosaver valve intermediate the upstream and downstream sides of the coalescing filter insures that the turbosaver valve passes the compressed air through the coalescing filter in the loading mode while permitting the purge air to by-pass the coalescing filter in the unloading mode.

In another aspect of the invention, the air dryer is provided which has a tamper resistant connecting member for sealably connecting the upper and lower housings so that the dryer cannot be improvidently disassembled.

27 Claims, 5 Drawing Sheets

SEALED AIR DRYER WITH TURBOSAVER VALVE

FIELD OF THE INVENTION

This invention relates generally to air dryers associated with vehicular air systems and, more particularly, to a tamper-resistant air dryer having a novel turbosaver valve for preventing the detrimental loss in engine power through the air dryer.

BACKGROUND OF THE INVENTION

Vehicles employing a turbocharged or supercharged engine and pneumatic braking systems are well known. The pneumatic braking system typically has an air compressor, a governor for controlling the operating cycle of the air compressor, an air dryer and a reservoir for holding pressurized air for delivery to the brakes. The air compressor operates successively in a loading (compressing) mode and an unloading (non-compressing) mode and typically obtains supercharged air, typically about 25 psig, from the air intake manifold of the engine.

When the pressure in the air reservoir falls below a predetermined minimum pressure, typically about 100 psig, the governor causes the air compressor to operate in the loading mode to compress air for storage in the air reservoir. Before storing the air in the air reservoir, the compressed air from the air compressor passes through an air dryer which removes moisture and other contaminants therefrom. When the air reservoir reaches the desired pressure, typically about 120 psig, the governor causes the air compressor to operate in the unloading mode.

In the unloading mode of many typical compressor systems, the supercharged air from the engine passes through the air compressor and into the air dryer and is then exhausted into the atmosphere by the air dryer purge valve. The unrestricted flow of supercharged air from the engine manifold is wasteful and results in a loss of engine power and efficiency, especially in turbocharged engines which require the supercharged air for engine power.

Attempts to prevent the loss of supercharged air or turbocharged boost during the unloading cycle have been largely unsuccessful. Attempts to utilize an external isolation valve to close the intake port of the air dryer have proven to be relatively unsuccessful, in part because they are relatively expensive to manufacture and install. Attempts to utilize a single internal isolation valve which acts as a purge valve and a turbosaver valve have not been entirely successful because the metal to metal contact between the metal turbosaver valve and the piston seat typically results in leakage problems. In addition, since both the purge valve and the turbosaver valve are interconnected, failure of one of the valves results in failure of the other valve.

It will also be appreciated that many conventional dryers typically have internal chambers which are attached together using a plurality of retaining bolts to store compressed gas during the loading and unloading modes. Since the compressed gas typically has relatively high pressures, the internal pressures exerted on the internal compartments of the dryer may be quite substantial. When properly released, for example, during the unloading mode, the compressed gas is harmless. However, premature dismantling of the gas dryer may cause the compressed gas to be released in an uncontrolled and undesirable manner. Tampering with the dryer or improper removal of the retaining bolts may result in an immense release of compressed gas, causing sections of the dryer to be propelled with considerable force. In some circumstances, untrained personnel dismantle the dryer when the dryer malfunctions because the retaining bolts are accessible and easily disassembled with readily available tools. The problems are enhanced when the untrained personnel improperly install the retaining bolts or neglect to reassemble all of the retaining bolts, not realizing the importance of proper assembly and maintenance. These problems are recognized by the industry as evidenced by some gas dryers which may have safety release valves or instructions attached to the dryer informing those inspecting or repairing the air dryer of the presence of the considerable internal pressures and the consequences resulting from the improper removal or tampering with the retaining bolts.

OBJECTS AND SUMMARY OF THE INVENTION

It is an object of this invention to provide an air dryer which prevents the loss of power and efficiency of the vehicle engine due to the operation of the braking system.

It is another object of this invention to provide an air dryer which prevents the loss of turbocharged boost through the air dryer during the unloading cycle.

It is another object of this invention to provide an air dryer having an internal turbosaver valve which directly seals the air intake port of the air dryer.

It is another object of this invention is to provide an air dryer having a turbosaver valve which is separate from the purge valve.

It is another object of this invention to provide an air valve dryer having a turbosaver which permits draining of the sump while preventing the loss of turbocharged boost.

It is another object of this invention to provide an air dryer having a turbosaver valve which controls the passage of air through the coalescing filter.

It is another object of this invention is to provide an air dryer having a turbosaver valve which prevents the intake air from passing downstream of the coalescing filter, thereby decreasing the chance of contaminants fouling the desiccant filter.

It is a still another object of this invention to provide an air dryer having a turbosaver valve which permits the purge air to bypass the coalescing filter in the unloading mode, thereby decreasing the back pressure in the desiccant filter.

It is a further object of the present invention to provide a tamper-resistant air dryer.

It is a still further object of the present invention to provide an air dryer which is relatively difficult to disassemble in the field but which is readily assembled in the manufacturing process.

In accordance with one of these objects, a novel and unique sealed air dryer and turbosaver valve is provided which prevents the supercharged air from the engine from being discharged through the air dryer. The novel and unique air dryer has an upper housing and lower housing. The upper housing comprises a desiccant filter for removing moisture from the air, a coalescing filter for filtering contaminants out of the air which would otherwise foul the desiccant filter, and a purge air chamber. The lower housing comprises an air intake port for receiving air from the air compressor, a control port for controlling the turbosaver valve and the purge valve, a dry air outlet port for delivering dry air to the air reservoir, and a sump exhaust port for purging the contaminants in response to the purge valve, and preferably a safety relief valve.

In a preferred embodiment, the air dryer comprises a stepped control port bore adapted to slidably receive the turbosaver valve for selectively sealing the control port bore and the horizontal intake bore. The turbosaver valve has an end land, a middle land, an interior land and an elastomeric disc attached to the interior land to provide an efficient seal between the turbosaver valve and the control port bore and the air intake bore. The turbosaver valve is disposed intermediate the drying chamber and the purge valve so that the turbosaver valve controls not only the flow of air through the coalescing filter but also the discharge of the purge air and the contaminants.

Disposing the turbosaver valve intermediate the drying chamber and the purge valve insures that the compressed air must pass through the coalescing filter in the loading mode while permitting the purge air to by-pass the coalescing filter in the unloading mode. In the loading mode, the compressed intake air forces the turbosaver valve to directly seal the control port bore in order to prevent the compressed air from the intake port from passing downstream of the coalescing filter and contaminating the desiccant filter. In the unloading mode, the turbosaver valve directly seals the air intake port in response to a control signal, allowing the purge valve to be opened without purging the supercharged air from the engine to the atmosphere during the unloading cycle. Unlike conventional air dryers which force the purged air to pass through the desiccant and the coalescing filters, permitting the purged air to by-pass the coalescing filter minimizes the back pressure in the desiccant filter which increases the efficiency of the air dryer.

In accordance with the aforementioned object of the invention of providing a tamper-resistant unit, the sealed air dryer comprises a tamper resistant connecting means for sealably connecting the upper and lower housings so that the dryer cannot be improvidently disassembled. In a preferred embodiment, the connecting means comprises an annular metal member having an arcuate-shaped cross section extending around the circumference of the dryer and adapted to deformably and sealably engage flanges projecting outwardly from the upper and lower housings to form an air-tight seal. Once the connecting member is deformably attached to the flanges beyond its elastic limit, the upper and lower housings cannot be disassembled without bending, cutting or otherwise destroying the integrity of the connecting member.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
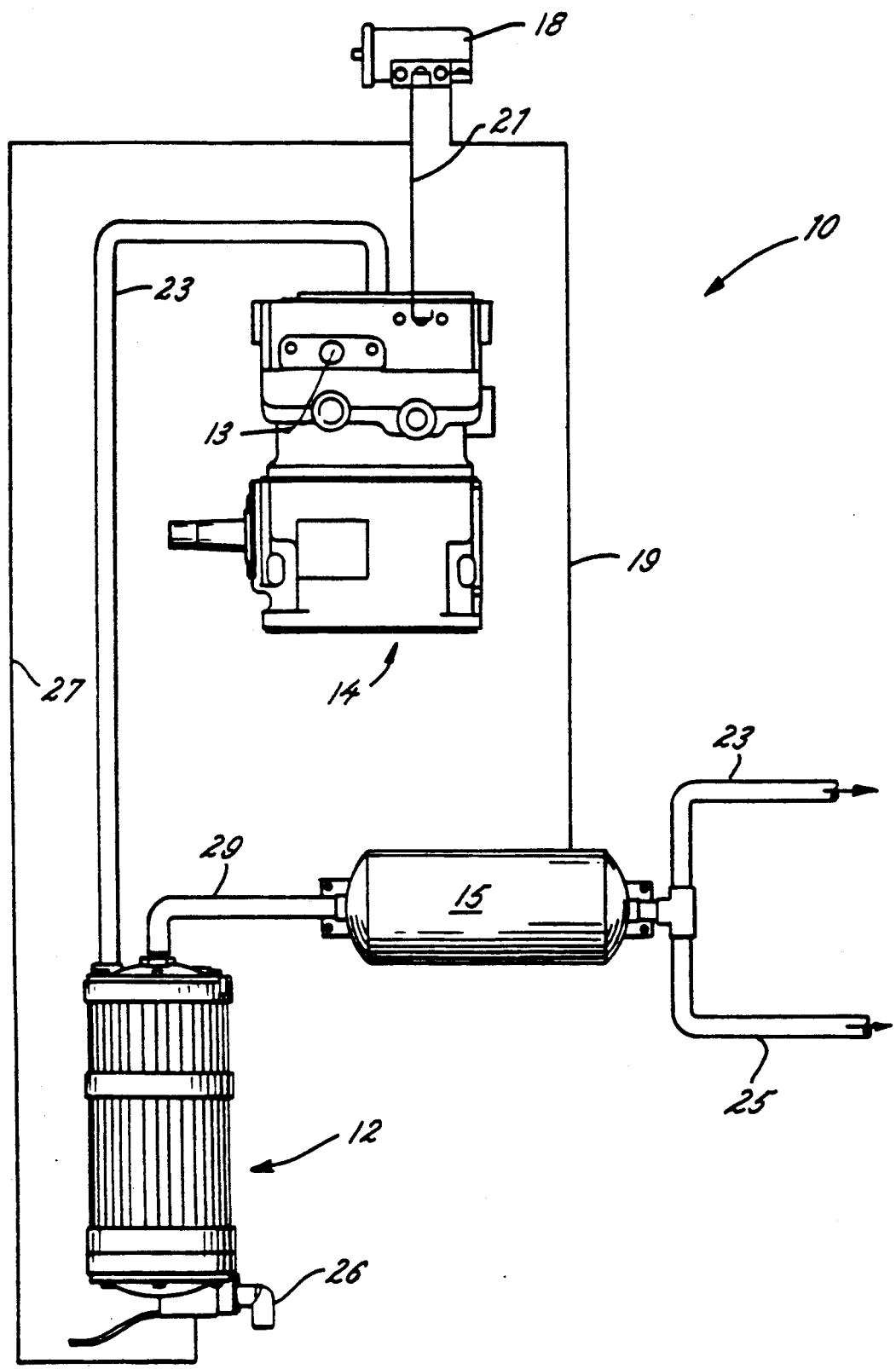
FIG. 1 is a schematic representation of a conventional braking system having an air compressor controlled by a governor, an air dryer, and an air reservoir.
Figure 2:
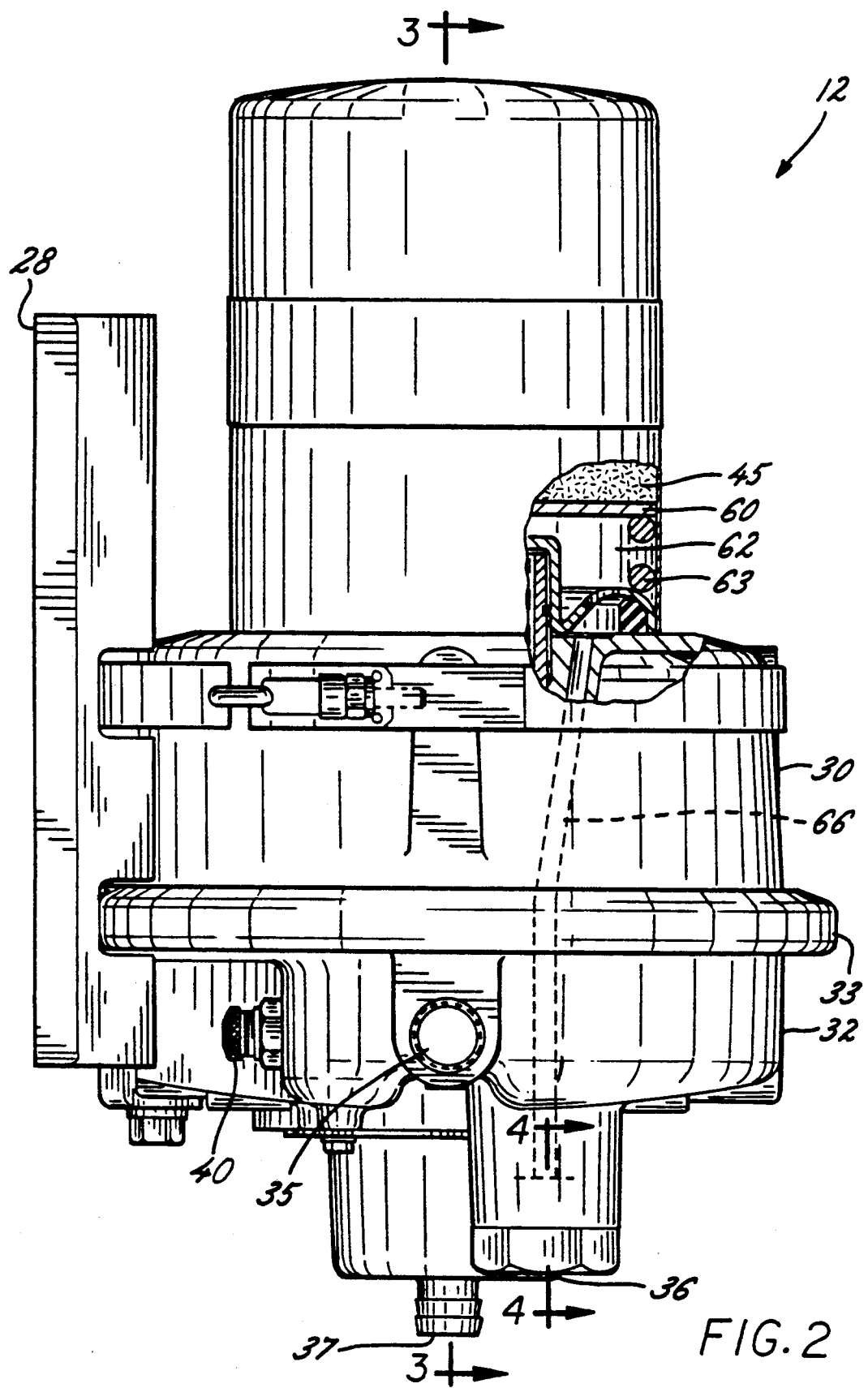
FIG. 2 is a side elevational view of an air dryer in accordance with the present invention.

Referring to FIG. 1 of the drawings, there is shown a schematic diagram of a conventional braking system 10 comprising an air dryer 12 in accordance with the present invention. The pneumatic braking system 10 typically has an air compressor 14 which operates in a loading (compressing) and unloading (non-compressing) mode, a governor 18 for controlling the operating cycle of the air compressor 14, an air dryer 12 for removing moisture and other contaminants from the compressed air, and an air reservoir 15 for holding pressurized air for delivery to the brakes (not shown).

When the air pressure in air reservoir 15 falls below a predetermined minimum first pressure level, typically about 100 psig, the compressor governor 18 causes the air compressor 14 to operate in the loading mode to compress air. Operation of an air compressor 14 by a governor 18 is well known and widely practiced in the pneumatic braking art. The governor 18 may be preset to respond to the operating parameters of the brake system 10. Signal line 19, which is continuously charged with air at the same pressure as the air in reservoir 15, provides communication between the air reservoir 15 and governor 18. Air line 21 connects the governor 18 with the air compressor 14 so that, depending on the pressure in the air reservoir 15, the air compressor 14 is caused to operate in either the loading mode or the unloading mode. A conventional air compressor 14 is adapted to receive supercharged or superatmospheric air, typically about 25 psig, from a turbocharged internal combustion engine (not shown) through air intake port 13. The size and capacity of the air compressor 14 will depend upon the operational parameters of the system.

In a typical air braking system 10, compressed air from compressor 14 passes through air line 23 to air dryer 12, which removes water and other contaminants therefrom. The dried compressed air from air dryer 12 is then passed via line 29 to the air reservoir 15 so as to maintain the desired air pressure therein for delivery to the air brakes of a vehicle through lines 23 and 25.

When the air pressure in the air reservoir 15 reaches the desired second pressure level, typically about 120 psig, the governor 18 signals the compressor 14 to unload (air compression is stopped) and the unloading cycle begins. In many conventional brake systems, the supercharged air from the engine passes freely through the unloaded air compressor 14, without being compressed, and then passes to the air dryer 12.

During the unloading cycle, conventional air dryers continuously discharge the air collected therein to the atmosphere to purge the air dryer of the collected moisture and contaminants. It will be appreciated that when the supercharged air passes through the dryer without restriction, it is lost to the atmosphere. The loss of the supercharged air from the engine manifold results in the loss of engine power and efficiency. This results in loss of engine efficiency when the air brake system is utilized with supercharged or turbocharged engines.

In accordance with one of the objects of the present invention, a novel and unique air dryer 12 and turbosaver valve 70 are provided which prevent the supercharged air from the engine from being discharged through the air dryer 12. FIGS. 2–6 illustrate an air dryer 12 provided with a turbosaver valve 70 in accordance with the present invention. The air dryer 12 is usually cylindrical in shape and can be mounted in the braking system 10 by means of an adjustable mounting bracket 28. The air dryer 12 has an upper housing 30 and lower housing 32, usually made of a lightweight material such as aluminum, which are connected by a connecting means 33. The connecting means 33 is described in detail below.

The upper housing 30 generally houses a coalescing filter 42, a desiccant filter 44, and a purge air chamber 46. The cylindrical coalescing filter 42 contains a glass fiber filter matrix 43 for filtering contaminants out of the air which would otherwise foul the desiccant filter 44. The desiccant filter 44 contains a molecular sieve material 45 for removing moisture from the air.

Figure 4:
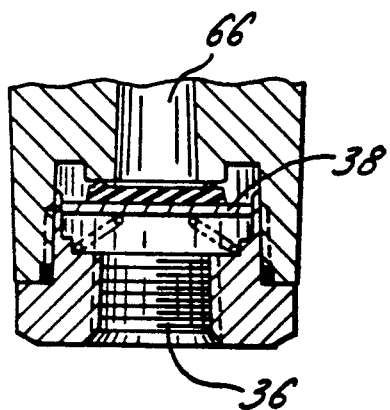
FIG. 4 is a cross sectional view taken along line 4—4 in FIG. 2 illustrating the air outlet port.

The lower housing 32 comprises an air intake port 34, a control port 35, a dry air outlet port 36, a sump exhaust port 37 and, preferably, a safety release valve 40. The air intake port 34 receives air from the air compressor 14 through air delivery line 23. The air outlet port 36 and a one-way check valve 38, as shown in FIG. 4, deliver dry air to the air reservoir 15 through air line 29. The control port 35 receives compressed air from the governor 18 through line 27 for controlling the turbosaver valve 70 and the purge valve 26.

Figure 5:
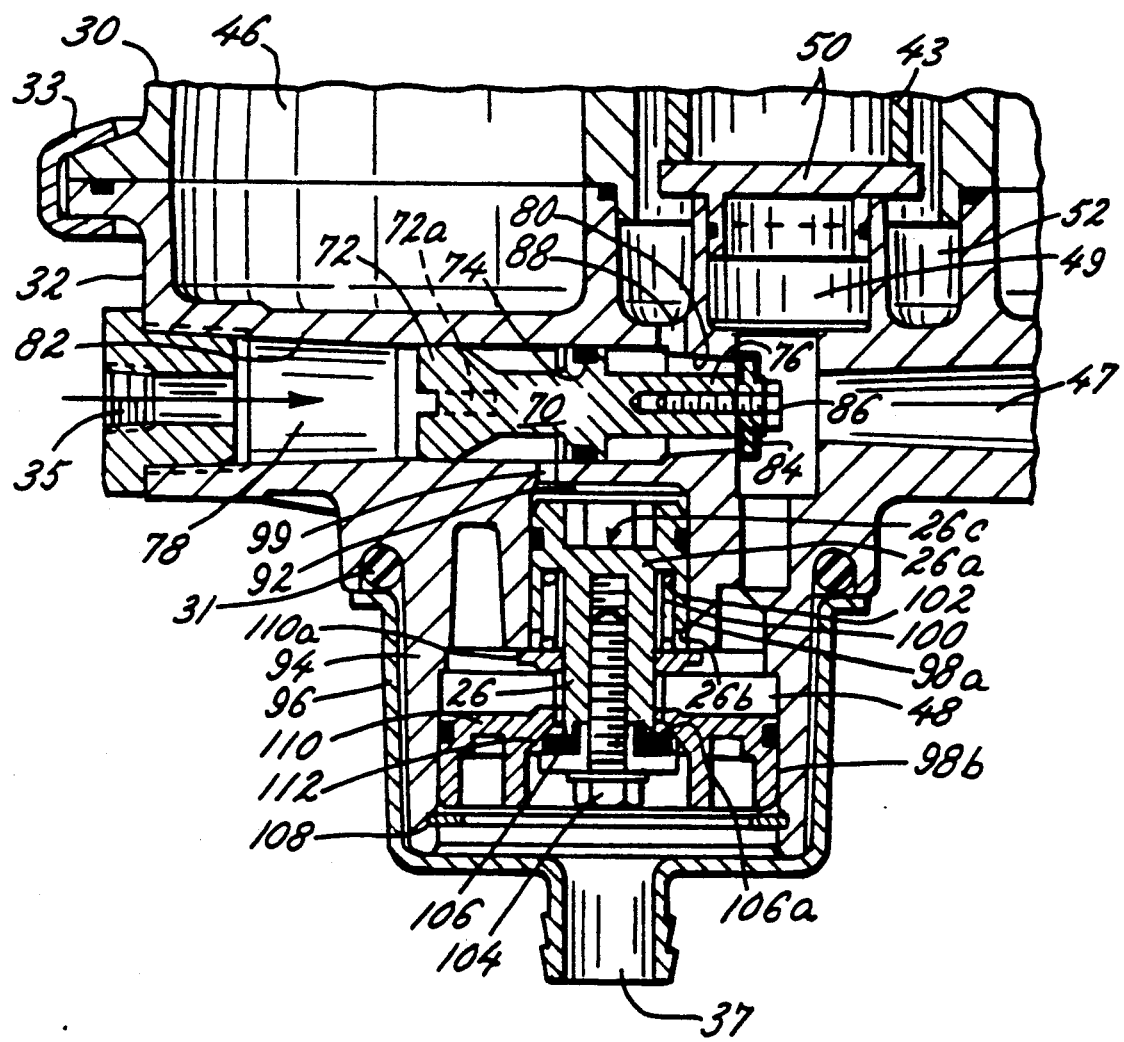
FIG. 5 is an enlarged cross sectional view of the lower housing of the air dryer in FIG. 2 illustrating the position of the turbosaver valve and the purge valve during the loading mode.

The lower housing 32 comprises an intake bore 47, a control port bore 78, and a purge valve bore 98. The stepped control port bore 78 is adapted to receive the turbosaver valve 70. Referring to FIG. 5, the control port bore 78 has an interior portion 80 which has a smaller diameter than the outer portion 82 of the bore 78. The turbosaver valve 70, which has an end land 72, a middle land 74 and an inside land 76, is adapted for slidable movement within the bore 78 for selectively sealing the control port bore 78 and the horizontal air intake bore 47. In accordance with one of the objects, an efficient seal is created between the turbosaver valve 70 and the bores 47, 78 by attaching an elastomeric disc 84 to the inside land 76 by any suitable means such as bolt 86. The elastomeric seal 84 may be made of any suitable material which will provide a tight seal between the turbosaver valve 70 and the bores 47, 78, including, for example, a nitrile material 84a covering a rigid steel reinforcement plate 84b. The interior portion 80 of the bore 78 is disposed between the middle land 74 and inside land 76 for controlling the horizontal movement of the turbosaver piston 70 and for providing a seat for the seal 84. The control port bore 78 has a purge air passage 88 which provides fluid communication between the collection chamber 52 and the sump chamber 48. In order to separate the purge air passage 88 and the control port 35, the control port 35 and purge air passage 88 are disposed on opposite sides of the middle land seal 74a.

The lower housing 32 comprises a valve housing 94 for holding the purge valve 26, an end cap 96 which generally secures the heater 31, and contains a sump exhaust port 37 which directs air to be exhausted from the air dryer 12 to the atmosphere. A snap ring 108 secures purge valve 26 in position. The purge valve 26 has a piston 26a. The piston 26a has a top face 26c and a bottom face 26b and a slot 100 for housing a spring 102. Nut 104 retains the elastomeric seal 106 on piston 26a. It will be noted that the top surface 26c of the piston 26a is larger than the bottom surface 26b which, in turn, is larger than the top surface 106a of the seal 106.

The valve housing 94 has a centrally disposed stepped purge valve bore 98. The top/interior portion 98a of the purge valve bore 98 has a smaller diameter than the bottom/outer portion 98b The top/interior bore 98a slidably receives the piston 26a of the purge valve 26 and has a control air passage 99 for providing fluid communication with the top face 26c of piston 26a and the control port 35. It will be appreciated that the end land 72 of the turbosaver valve 70 has a slot 72a for permitting the control port 35 to communicate with the control air passage 99 and top face 26c of piston 26a. The bottom/outer portion 98b of the bore 98 rigidly houses the valve seat 110 having an inclined portion 112, typically about 45 degrees, and a rigid piston stop 110a.

Upon reference to FIG. 5, it will be seen that the spring 102 is disposed between the piston 26a and the rigid piston stop 110a so that the biasing force of the spring 102 will exert a constant upward force which must be overcome in order to open the purge valve 26. The combination of the spring 102 and the piston stop 110a permits limited reciprocating movement of the purge valve 26 in the top/interior bore 98a. The purge valve seal 106 is adapted to sealably engage the inclined portion 112 to form a fluid-tight seal.

Figure 3:
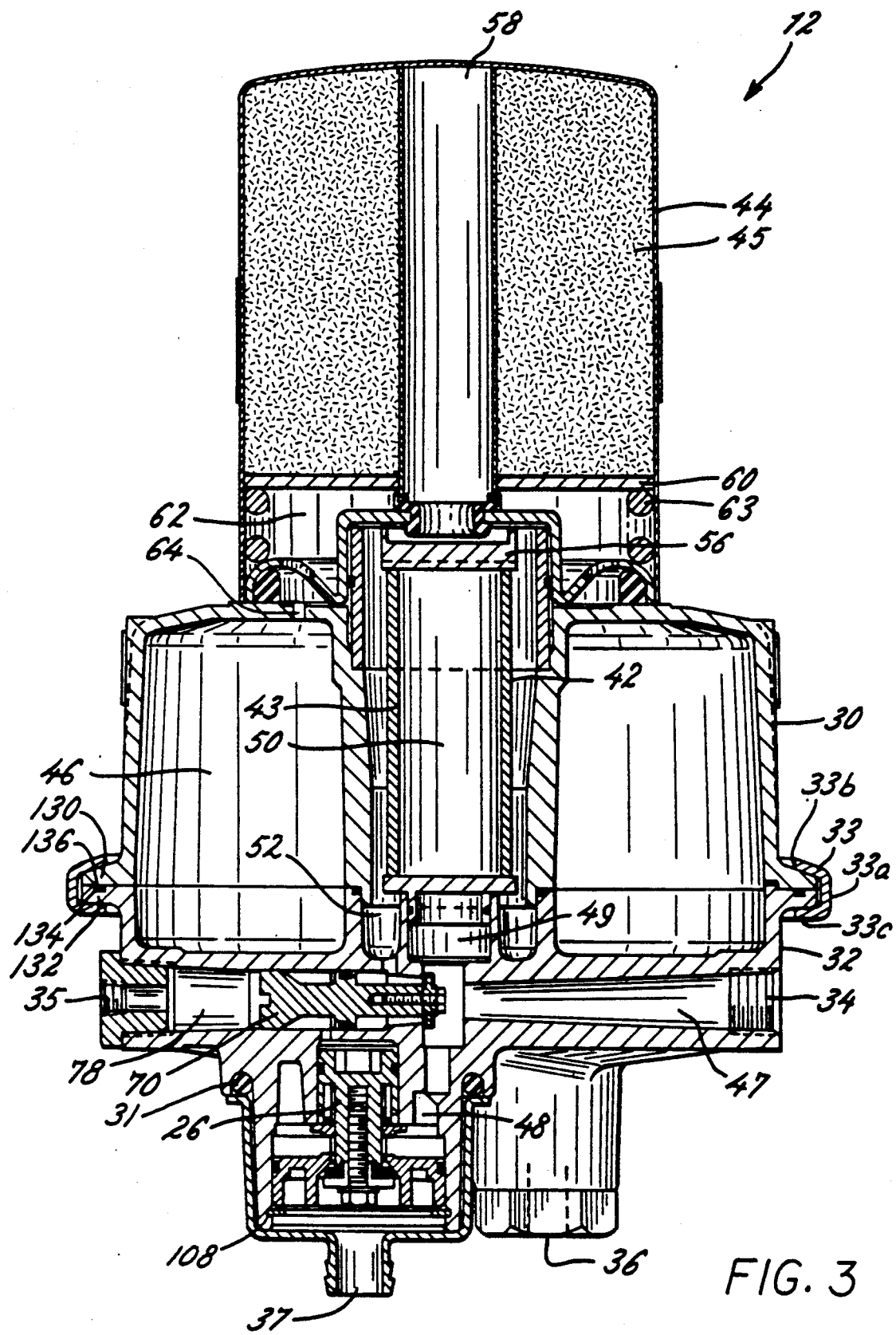
FIG. 3 is a cross-sectional view taken along line 3—3 in FIG. 2 illustrating the turbosaver valve and the tamper resistant connecting means in accordance with the present invention.

The operation of the air dryer 12 and the turbosaver valve 70 is illustrated in FIGS. 2–6 During the loading mode, the air compressor 14 delivers compressed air, typically about 120 psig, to the air dryer 12 through air line 23. As the compressed air enters the air intake port 34 through the horizontal air intake bore 47, it positions the turbosaver valve 70 to the left as shown in FIGS. 3 and 5. The compressed air fills the sump chamber 48 and the chamber 49 disposed below the coalescing filter 42. The air enters the center tube 50 of the coalescing filter 42 where it passes through the filter matrix 43 to an elongated and annular collection chamber 52. The filter matrix 43 removes contaminants in the air such as oil, oil vapor, water in liquid form and other solid contaminants. The contaminants drain down the outside of the filter 42 into the collection chamber 52 and down the inside of the center tube 50 into the sump chamber 48 for subsequent disposal during the unloading mode. The filtered compressed air passes upwardly through a perforated top plate 56 of the coalescing filter 42 into the center tube 58 of the desiccant filter 44.

The compressed air passes from the center tube 58 into the desiccant material 45 which removes moisture from the air. The dry air then passes downwardly through a perforated bottom plate 60 into the dry air chamber 62. The spring 63 acts on the bottom plate 60 to maintain a compressive force on the desiccant material 45. A portion of the dry air (the purge air) flows through a relatively narrow passage 64, typically about 0.060 inches in diameter, and is stored in the annular purge air chamber 46. The greater portion of the dry air flows to the outlet port 36 through outlet channel 66 and one way check valve 38 and through air line 29 to air reservoir 15.

Figure 6:
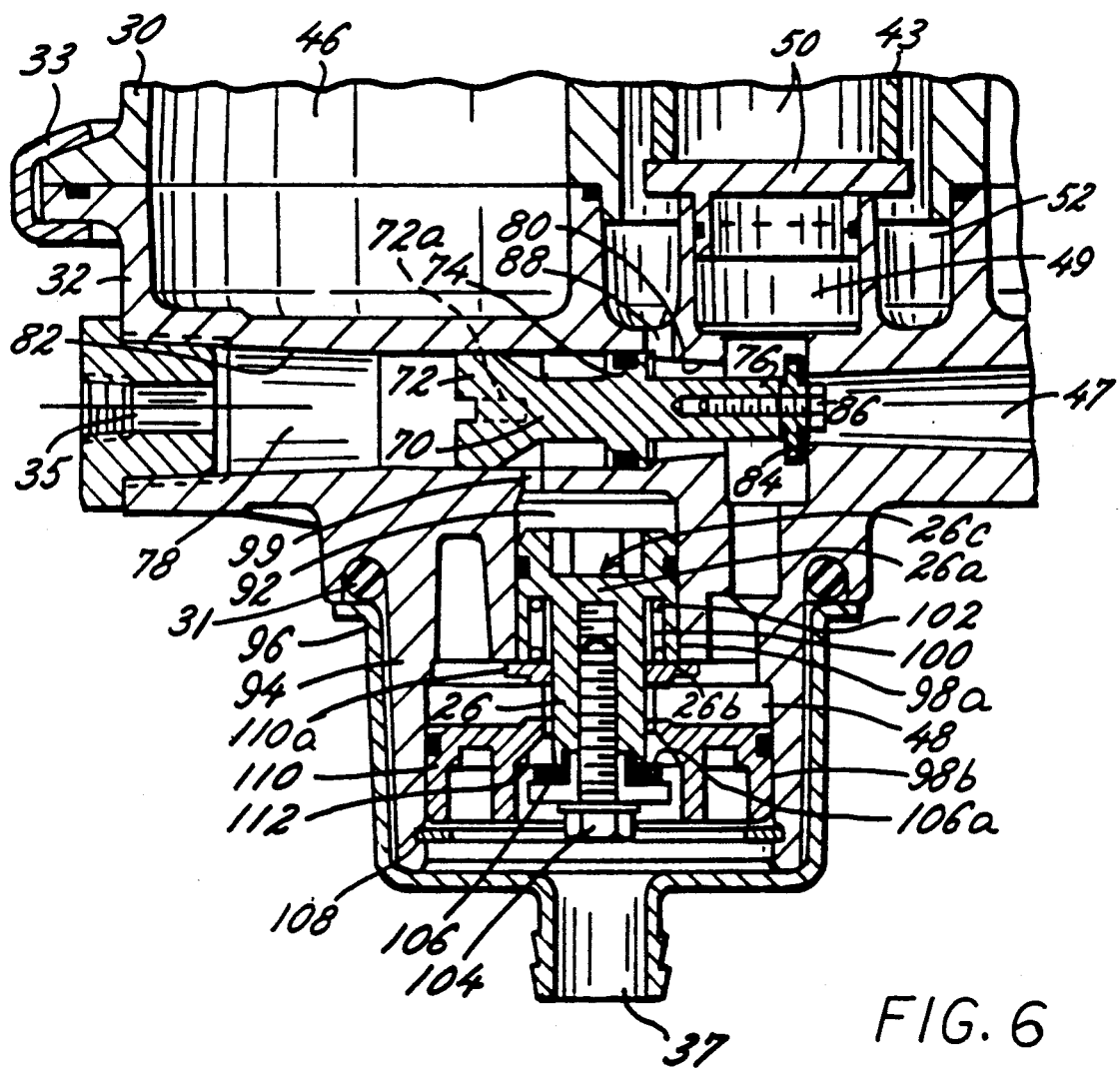
FIG. 6 is an enlarged cross sectional view of the lower housing of the air dryer in FIG. 2 illustrating the position of the turbosaver valve and the purge valve during the unloading mode.

The detailed operation of the turbosaver valve 70 and the purge valve 26 is best illustrated in FIGS. 5–6. FIG. 5 illustrates the operation of the turbosaver valve 70 when the braking system 10 is activated and the air compressor 14 is in the loading mode. At the start of the loading mode, the gas pressure in the air dryer 12 is between atmospheric pressure and below the pressure required by the air reservoir 15 and the pressure at the control port 35 is about zero. The compressed air, typically about 120 psig, entering the intake port 34 from the air compressor 14, forces the turbosaver valve 70 to the left as illustrated in FIGS. 3 and 5. In accordance with one of the objects of the invention, the turbosaver valve 70 directly seals the control port bore 78 and prevents the compressed air from the intake port 34 from passing downstream of the coalescing filter 42 and contaminating the desiccant filter 44.

The internal pressure, typically about 120 psig, of the air dryer 12 exerts a downward force on the face 106a of the purge valve seal 106 and an upward force on the bottom surface 26b of the purge valve piston 26a. Since the area of the face 106a is smaller than the bottom surface 26b, the downward force on the seal 106 is insufficient to overcome the combination of the upward force on the piston 26a and the upwardly biasing force of the spring 102 so that the seal 106 is tightly closed against the valve seat 112. Thus, the purge valve 26 remains closed, thereby preventing the compressed air from escaping through the exhaust port 27. The turbosaver valve 70 and the purge valve 26 remain in this position until the air reservoir obtains the required air pressure, typically about 120 psig, at which time the unloading mode is initiated.

When the air pressure in the air reservoir 15 reaches the desired pressure, typically about 120 psig, the governor 18 signals the compressor 14 to unload (air compression is stopped) and the unloading cycle begins. The check valve 38 is closed during the unloading cycle of the compressor 14 and retains the compressed air in the air reservoir 15. At the start of the unloading mode, the air pressure in the air dryer 12 is approximately the required pressure of about 120 psig. The pressure at the intake port 34 decreases as the supercharged air from the engine, typically about 25 psig, passes through the compressor 14 and enters the intake port 34.

In accordance with another object of the invention, the turbosaver valve 70 directly seals the air intake port 34 and prevents the supercharged air from the engine from being discharged through the air dryer 12 during the unloading cycle when the governor 18 sends a pneumatic signal, typically about 120 psig, through line 27 to control port 35 which forces the turbosaver valve 70 to the right as shown in FIG. 6. By sealing the air intake port 34, the turbosaver valve 70 allows the purge valve 26 to be opened without purging the supercharged air from the engine to the atmosphere.

In order to open the purge valve 26, the control signal also passes through the control air passage 99 and acts on the top surface 26c of the piston 26a. The pressure exerts a downward force on the top surface 26c of the purge valve piston 26a. The internal pressure of the air dryer 12 also exerts a downward force on the face 106a of the valve seal 106. The downward forces on top surface 26c of the piston 26a and the seal face 106a are sufficient to overcome the upward force on the bottom face 26b of the piston 26a and the upwardly biasing force of the spring 102. Thus, the valve seal is forced downwardly as shown in FIG. 6 to an open position.

When the purge valve 26 is opened, the compressed air (typically about 120 psig) in the desiccant filter 44 volume, the coalescing filter 42 volume and the sump 52 volume and any contaminants contained in the collection chamber 52 and the sump 48 are immediately expelled. The compressed purged air in the purge air chamber 46 is restricted by the small passage 64 and therefore, slowly expands to atmospheric pressure and increases its volume. The dry purge air migrates back through the desiccant filter 44 to the open purge valve 26, thereby removing the moisture collected in the desiccant material 45 and reactivating the desiccant material 45. The purge valve remains open until the control port 35 (and the turbosaver valve 70) is deactivated in the loading mode. It will be noted that the governor 18 continues to feed pressurized air to the control port 35 thereby forcing the turbosaver piston 70 to maintain the intake port 34 in a closed position. When the compressor 14 switches back to the loading cycle, the pressure at the control port 35 becomes zero and the turbosaver valve 70 and purge valve 26 assume the position illustrated in FIG. 5.

Upon reference to FIGS. 3 and 5–6, it will be appreciated that the turbosaver valve 70 is intermediate the purge chamber 46 and the purge valve 26. In accordance with one of the objects of the invention, the turbosaver valve 70 controls the discharge of the purge air and the contaminants and the flow of air through the coalescing filter 42. Referring to FIG. 3, it will be seen that the turbosaver valve 70 forces the compressed air to pass through the coalescing filter 42 in the loading mode. In the unloading mode, however, the turbosaver valve permits the purged air to by-pass the coalescing filter 42. Unlike conventional air dryers which force the purged air to pass through the desiccant and the coalescing filters 44, 42, the turbosaver valve 70 permits that the purged air by-pass the coalescing filter 42 which minimizes the back pressure on the desiccant filter 44. Minimizing the back pressure increases the efficiency thereof.

Figure 7:
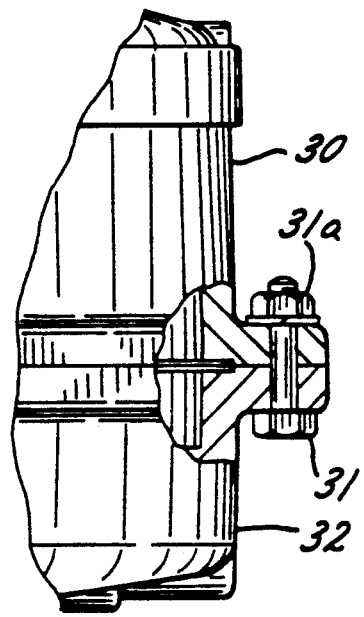
FIG. 7 is a view of a prior art dryer which connected by a plurality of retaining bolts and lacks the tamper-resistant feature of the present invention.

It should now be appreciated that the internal pressures in the air dryer 12 will be on the order of 120 psig in the illustrated brake system 10 although the internal pressures in the dryer 12 may be even higher in other systems. Thus, the upper and lower housings 30, 32 must be securely connected to each other. Heretofore, conventional air dryers have utilized a plurality of retaining bolts 31 to connect the upper and lower housings 30, 32 as shown in FIG. 7. However, as discussed earlier, improvident removal of the retaining bolts by untrained personnel during a malfunction, for example, may cause the two housings 30, 32 to separate with considerable force if the personnel do not properly release the internal pressure. The nature of the retaining bolts 31 only aggravates the situation because the retaining nut 31a may be easily disassembled using tools readily available. In accordance with one of the objects of the present invention, the novel and unique sealed air dryer 12 avoids the reckless disassembly of the upper and lower housings 30, 32 by the connecting member 33.

Referring to FIG. 3, the novel and unique air dryer 12 comprises a flange 130 projecting outwardly from the upper housing 30 and a flange 132 projecting outwardly from the lower housing 32. Both flanges 130, 132 extend around the circumference of the air dryer 12 and are adapted to provide an air-tight or hermetic seal. In a preferred embodiment, one of the flanges such as lower flange 132 has a groove 134 therein for receiving a seal member 136 such as, for example, an O-ring or the like. In order to form the air-tight seal, the upper and lower flanges 130, 132 are compressibly sealed by the deformable connecting member 33.

In the preferred embodiment, the connecting member 33 is an annular member which is adapted to extend around the circumference of the flanges 130, 132. Referring to FIG. 3, it will be seen that the connecting means 33 has an arcuate-shaped cross-section having a middle body portion 33a and two ends 33b, 33c which are adapted to engage the two flanges 130, 132 therebetween. Typically, the inner diameter of the connecting means 33 may be slightly larger than the outer diameter of the flanges 130, 132 to facilitate engagement therebetween. In other embodiments (not shown), the connecting member 33 may be an axially slotted section or a plurality of smaller sections. The preferred material for the connecting member 33 is steel because of its combination of strength and ductility, although other metals may be used.

In order to seal the dryer 12, the seal member 136 is placed in groove 134 and the upper and lower housings 30, 32 and the respective flanges 130, 132 are disposed adjacent each other. It will be noted that the internal pressure of the dryer 12 during assembly is at atmospheric pressure. After the connecting member 33 is located adjacent the flanges 130, 132, the connecting member is deformed beyond its elastic limit so that it connects the flanges 130, 132 and, concomitantly, the upper and lower housings 30, 32, and creates an airtight seal therebetween. The connecting member 33 may be deformably attached to the flanges 130, 132 using, for example, a press or the like to crimp the edges of the connecting member 33 over the flanges 130, 132. In addition to crimping, other methods may be used to deformably attach the connecting member 33 such as, for example, metal spinning, coining or over-center forming techniques which will be known to those skilled in the art. The metal spinning operation may be performed on a lathe or the like in the conventional manner.

Once the connecting member 33 is deformably attached to the flanges 30a, 32a, the upper and lower housings 30, 32 cannot be disassembled without bending, cutting or otherwise destroying the integrity of the connecting member 33 by deforming it beyond its elastic limit unlike the conventional retaining bolts 31, which may be easily removed and reassembled using readily available tools. Since the typical personnel will not have the proper tools to reassemble the dryer 12 and connecting member 33, improvident disassembly of the dryer 12 will be deterred.

It should be understood that although the present invention is described and illustrated with an air dryer used in a pneumatic brake system, the connecting means 33 is adaptable to other types of gas dryers including, but not limited to, dryers which require separate sections to be connected or dryers which have elevated internal pressures and all of these devices are intended to come within the scope of the present invention.

I claim as my invention:

1. A braking system for vehicles comprising
a source of gas;
a gas compressor for maintaining the gas pressure in a gas reservoir between a predetermined first pressure level in which the compressor compresses the gas and a predetermined higher second pressure level in which the compressor ceases to compress the gas; and
a gas dryer intermediate the compressor and the reservoir for drying the compressed gas, the gas dryer comprising a gas intake port in communication with the compressor for receiving gas from the compressor and a gas outlet port in communication with the reservoir, a coalescing filter downstream of the intake port for removing contaminants from the gas, a desiccant filter downstream of the coalescing filter for removing moisture from the gas and delivering a portion of the dry gas to the outlet port and purge gas to a purge gas chamber, and a passage disposed between the coalescing and desiccant filters permitting the purge gas to bypass the coalescing filter when the second pressure level is reached.

2. A braking system in accordance with claim 1 wherein the gas dryer comprises
upper and lower housings for housing the intake and outlet ports, the desiccant and coalescing filters and the purge air chamber, each housing having a flange projecting outwardly therefrom at least partially around the circumference of the housing; and
a connecting member being deformed beyond its elastic limit to sealably connect the flanges to each other so that the connecting member must be deformed beyond its elastic limit to remove the connecting member therefrom.

3. The air dryer as set forth in claim 2 wherein
the connecting member is an annular member extending substantially around the entire circumference of the housing.

4. The air dryer as set forth in claim 2 wherein
the connecting member is an axially slotted annular member extending substantially around the entire circumference of the housing.

5. The air dryer as set forth in claim 2 wherein
the connecting member comprises a plurality of annular sections disposed around the circumference of the housing.

6. The air dryer as set forth in claim 2 wherein
the connecting member has an arcuate shape cross-section having a middle portion and two ends adapted to receive the flanges therebetween and be deformed beyond its elastic limit to seal the flanges therebetween.

7. A braking system in accordance with claim 1 wherein the gas dryer comprises a turbosaver valve for controlling the flow of gas through the passage.

8. A braking system in accordance with claim 7 wherein the gas dryer comprises means for driving the turbosaver valve into sealing engagement with the gas intake port when the second pressure level is reached.

9. A braking system in accordance with claim 8 wherein the driving means comprises a bore having a control port for receiving a control signal indicting that the second pressure level has been reached; and the turbosaver valve having a piston movable within the bore in communication with the control signal on one side thereof and a seal on the other side of the piston for engaging and sealing the gas intake port in response to the control signal.

10. A braking system in accordance with claim 7 wherein the gas dryer comprises a turbosaver valve for sealing the gas intake port to prevent the discharge of the supercharged gas.

11. A braking system in accordance with claim 7 wherein the turbosaver valve prevents the flow of gas through the passage when the gas pressure is below the second pressure level and permits the flow of gas through the passage to bypass the coalescing filter when the second pressure level is reached.

12. A braking system for vehicles comprising:
a source of gas;
a gas compressor for maintaining the gas pressure in a gas reservoir between a predetermined first pressure level in which the compressor compresses the gas and a predetermined higher second pressure level in which the compressor ceases to compress the gas; and
a gas dryer intermediate the compressor and the reservoir for drying the compressed gas, the gas dryer comprising a gas intake port in communication with the compressor for receiving gas from the intake port and a gas outlet port in communication with the reservoir, a coalescing filter downstream of the intake port for removing contaminants from the gas wherein the coalescing filter has upstream and downstream sides relative to the flow of the gas, a desiccant filter downstream of the coalescing filter for removing moisture from the gas and delivering a portion of the dry gas to the outlet port and purge gas to a purge gas chamber, and a turbosaver valve intermediate the upstream and downstream sides of the coalescing filter for controlling the flow of gas through the coalescing filter so as to permit gas to bypass the coalescing filter when the second pressure level has been reached.

13. A braking system as set forth in claim 12 wherein the turbosaver valve directs the intake gas through the coalescing filter until the second pressure level is reached.

14. A braking system in accordance with claim 12 wherein the gas dryer comprises:
a bore having a control port for receiving a control signal indicating that the second pressure level has been reached and a purge air passage providing fluid communication between a sump and the purge gas chamber, and
the turbosaver valve having a piston movable within the bore and intermediate the control pot and a sump port and a seal slidably disposed to close the purge air passage to direct the intake gas through the coalescing filter until the second pressure level is reached and to open the purge air passage to permit the purge air to bypass the coalescing filter when the second pressure level is reached.

15. In a braking system for vehicles having a source of gas, a gas compressor for maintaining the gas pressure in a gas reservoir between a predetermined first pressure level in which the compressor compresses the gas and a predetermined higher second pressure level in which the compressor ceases to compress the gas, and a gas dryer intermediate the compressor and the reservoir for drying the compressed gas, the gas dryer comprising:
a gas intake port in communication with the compressor and a gas outlet port in communication with the reservoir,
a coalescing filter downstream of the intake port for removing contaminants from the gas, a desiccant filter downstream of the coalescing filter for removing moisture from the gas and delivering a portion of the dry gas to the outlet port and purge gas to a purge gas chamber, and a passage disposed between the coalescing and desiccant filters permitting the purge gas to bypass the coalescing filter when the second pressure level is reached.

16. A gas dryer in accordance with claim 15 wherein the gas dryer comprises:
a bore having a control port for receiving a control signal indicating that the second pressure level has been reached and the purge air passage providing fluid communication between a sump and the purge gas chamber; and
a purge valve for exhausting purge gas from the purge air chamber through a sump,
the purge valve having a piston movable within the bore intermediate the control port and the purge air passage and a seal for opening the purge air passage to permit the purge gas to flow to the sump and for closing the purge air passage to prevent the purge gas from flowing to the sump in response to the control signal.

17. A gas dryer as set forth in claim 15 comprising a bore;
a purge valve for exhausting purge gas from the purge air chamber through a sump
the purge valve having a piston slidably disposed in the bore;
a purge air inlet providing fluid communication between the purge air chamber and the bore on one side of the piston;
the sump is in fluid communication with the one side of the piston;
a control air inlet providing fluid communication between the control port and the valve bore on the other side of the piston;
a sealing member between the one side of the piston and the sump; the sealing member being biased to a closed position but responsive to pressure on each side of the piston so as to open to discharge purge gas from the purge air chamber when the second pressure level is reached and to return to the closed position below the second pressure level.

18. A braking system in accordance with claim 15 wherein the gas dryer comprises a turbosaver valve for controlling the flow of gas through the passage.

19. A braking system in accordance with claim 18 wherein the turbosaver valve prevents the flow of gas through the passage when the gas pressure is below the second pressure level and permits the flow of gas through the passage to bypass the coalescing filter when the second pressure level is reached.

20. A braking system in accordance with claim 18 wherein the gas dryer comprises a turbosaver valve for sealing the gas intake port to prevent the discharge of the supercharged gas.

21. A braking system in accordance with claim 18 wherein the gas dryer comprises
means for driving the turbosaver valve into sealing engagement with the gas intake port when the second pressure level is reached.

22. A braking system in accordance with claim 21 wherein the driving means comprises a bore having a control port for receiving a control signal indicting that the second pressure level has been reached; and
the turbosaver valve having a piston movable within the bore in communication with the control signal on one side thereof and a seal on the other side of the piston for engaging and sealing the gas intake port in response to the control signal.

23. In a system equipped with a gas compressor for maintaining the gas pressure in a gas reservoir between a predetermined first pressure level in which the compressor compresses the gas and a predetermined higher second pressure level in which the compressor ceases to compress the gas, and a gas dryer intermediate the compressor and the reservoir for receiving and drying the compressed gas such that the compressed gas exerts an internal pressure on the gas dryer, the gas dryer comprising:
a gas intake port in communication with the compressor for receiving the compressed gas from the compressor and a gas outlet port in communication with the reservoir;
a desiccant filter downstream of the intake port for removing moisture from the gas and delivering a portion of the dry gas to the outlet port and purge gas to a purge gas chamber;
upper and lower housings for housing the intake and outlet ports, the desiccant filter, and the purge air chamber, each housing having a flange projecting outwardly therefrom at least partially around the circumference of the housing; and
a connecting member being deformed beyond its elastic limit to sealably connect the flanges to each other so that the connecting member must be deformed beyond its elastic limit to remove the connecting member therefrom.

24. The air dryer as set forth in claim 23 wherein the connecting member is an annular member extending substantially around the entire circumference of the housing.

25. The air dryer as set forth in claim 23 wherein the connecting member is an axially slotted annular member extending substantially around the entire circumference of the housing.

26. The air dryer as set forth in claim 23 wherein the connecting member comprises a plurality of annular sections disposed around the circumference of the housing.

27. The air dryer as set forth in claim 23 wherein the connecting member has an arcuate shaped cross-section having a middle portion and two ends adapted to receive the flanges therebetween and be deformed beyond its elastic limit to seal the flanges therebetween.

* * * * *

UNITED STATES PATENT AND TRADEMARK OFFICE
CERTIFICATE OF CORRECTION

PATENT NO. : 5,334,230

DATED : August 2, 1994

INVENTOR(S) : ALAN SLOKA

It is certified that error appears in the above-identified patent and that said Letters Patent is hereby corrected as shown below:

Column 2, line 33, after "invention" delete "is";

Column 2, line 43, after "invention" delete "is";

Column 2, line 48, after "is" delete "a";

Column 4, line 15, after "which" insert -- is --; and

Column 6, line 48, after "FIGS. 2-6" insert -- . --.

IN THE CLAIMS:

Column 11, line 34, after "receiving" insert -- intake --;

Column 11, line 62, delete "pot" and substitute therefor -- port --;

Signed and Sealed this

Seventh Day of March, 1995

*Attest:*

*Attesting Officer*

BRUCE LEHMAN

*Commissioner of Patents and Trademarks*